United States Patent
Iijima et al.

(10) Patent No.: US 6,869,458 B2
(45) Date of Patent: Mar. 22, 2005

(54) BIOCLEAN ROOM UNIT

(75) Inventors: Kazuaki Iijima, Tokyo (JP); Takashi Yachi, Tokyo (JP); Saburo Takagi, Tokyo (JP)

(73) Assignee: Sanki Engineering Co., Ltd., Tokyo (JP)

( * ) Notice: Subject to any disclaimer, the term of this patent is extended or adjusted under 35 U.S.C. 154(b) by 15 days.

(21) Appl. No.: 10/428,852

(22) Filed: May 5, 2003

(65) Prior Publication Data

US 2004/0221554 A1 Nov. 11, 2004

(51) Int. Cl.[7] .......................... B01D 29/01; B01D 46/10
(52) U.S. Cl. ..................... 55/385.2; 55/318; 55/338; 55/472; 55/485; 96/224
(58) Field of Search ................. 55/315, 318, 338, 55/339, 356, 385.1, 467, 385.2, 470–473, 485; 96/223, 224, 226

(56) References Cited

U.S. PATENT DOCUMENTS

| | | | | |
|---|---|---|---|---|
| 3,277,638 A | * | 10/1966 | Soltis ........................... 55/473 |
| 3,462,920 A | * | 8/1969 | Denny ........................... 55/413 |
| 3,511,162 A | * | 5/1970 | Truhan ........................ 454/187 |
| 3,601,031 A | * | 8/1971 | Abel et al. .................. 454/187 |
| 3,708,963 A | * | 1/1973 | Boonstra et al. .............. 55/373 |
| 3,782,265 A | * | 1/1974 | Pielkenrood et al. ........ 454/187 |
| 3,838,556 A | * | 10/1974 | Finger ........................ 55/385.2 |
| 3,893,457 A | * | 7/1975 | van der Waaij ............. 128/847 |
| 3,935,803 A | * | 2/1976 | Bush .......................... 454/189 |
| 5,225,167 A | * | 7/1993 | Wetzel ........................ 96/224 |
| 5,616,172 A | * | 4/1997 | Tuckerman et al. ........... 96/16 |
| 5,645,480 A | * | 7/1997 | Spengler ..................... 454/187 |
| 5,688,297 A | * | 11/1997 | Spengler ..................... 55/356 |
| 5,833,727 A | * | 11/1998 | Skarsten ................... 55/385.2 |
| 5,876,489 A | * | 3/1999 | Kunisaki et al. .............. 96/226 |
| 5,997,619 A | * | 12/1999 | Knuth et al. .................. 96/224 |
| 6,383,242 B1 | * | 5/2002 | Rogers et al. ............. 55/385.2 |

FOREIGN PATENT DOCUMENTS

| | | | |
|---|---|---|---|
| EP | 0383402 | * | 8/1990 |
| JP | 06-221639 | | 8/1994 |
| JP | 08-189680 | | 7/1996 |
| JP | 08-270999 | | 10/1996 |
| JP | 09-222247 | | 8/1997 |
| JP | 2002-061910 | | 2/2002 |

* cited by examiner

Primary Examiner—Robert H. Spitzer
(74) Attorney, Agent, or Firm—Oblon, Spivak, McClelland, Maier & Neustadt, P.C.

(57) ABSTRACT

A bioclean room is formed surrounded by a frame body with side portions of the frame opened and curtains to be selectively opened and shut to cover opened side portions of the frame body. An air flow passage is equipped with an air cleaning device to deliver the air in the frame body along a top plate to an air blow duct above the patient's head through which clean air is blown into the bioclean room. The frame body is equipped with an opening on the head side of the patient through which a medical console can be received inside the bioclean room when the frame body is brought into abutment against a wall.

16 Claims, 4 Drawing Sheets

BIOCLEAN ROOM UNIT

BACKGROUND OF THE INVENTION

1. Field of the Invention

The present invention relates to a bioclean room unit.

2. Description of the Related Art

Patients whose immunity has been weakened, for example, need to be isolated for having treatment in a germ-free living space (bioclean room) in a hospital for a few weeks. As such a germ-free living space for treatment, a bioclean room unit is generally known.

A conventional bioclean room unit is shown in FIG. 1 in which the reference symbol a denotes a frame body. The frame body a comprises a box b with a fan unit therein; beams c attached at their one ends to upper lateral ends of the box b to extend horizontally away from the box b; a beam d arranged to interconnect the other ends of the beams c; a beam e arranged parallel to the beam d so as to interconnect intermediate portions of the beams c; and pillars f arranged upright to be connected with other ends of the beams c.

A top plate (not shown) is fixed to the frame body a and a transparent plastic curtain g which may be opened and shut is provided on three sides of the frame body a other than that on the box b. In this way, the bioclean room h defined by the box b, the top plate and the curtain g of the frame body a is formed inside the bioclean room unit, a bed i being placed inside the bioclean room h.

On a side surface of the box b, provided are air intakes j from which air k is taken into the box b by the fan unit in the box b. On a surface of the box b facing the bioclean room h, provided are air blow outlets 1 so as to blow the air toward a head of a patient lying on the bed i.

The air k taken into the box b from the air intakes j is made dust-free by dust removing means in the fan unit. The air k thus cleaned is blown from the air blow outlets 1 into the bioclean room h to flow from a head side to a foot side of the patient. In this way, the bioclean room h is kept germ-free.

A flow rate of the clean air k blown from the air blow outlets 1 into the bioclean room h is adjusted with a remote switch while the patient is treated from outside of the bioclean room unit by means of a head port and a glove box.

The bioclean room unit as described above, however, has the following disadvantages.

i) Since the fan unit is in the box b on the head side of the patient, sources of noise such as the fan and the air blow outlets 1 are positioned close to the patient's head. Under such circumstances, the patient is unlikely to feel comfortable in the space.

ii) Since the air k is constantly taken in from the outside, the dust removing means such as filters in the fan unit and a high efficiency particulate air filter (called as HEPA filter) are easily contaminated. This requires frequent replacement of the dust removing means, possibly resulting in increase in cost.

iii) Whenever somebody comes in or out or brings supplies into or out from the bioclean room h, the remote switch must be switched to increase or decrease the quantity of the air k via the air blow outlets 1 in connection with opening or shutting of the curtain g. In such a case, the operator might omit to switch on or off.

iv) The space in the bioclean room h is so small as to make the patient staying inside feel oppressed.

v) Since the head side of the patient is occluded by the box b, the patient cannot reach and operate a medical console on a wall of a sickroom.

vi) The pillars installed upright and oppositely on the foot side of the patient make it difficult to bring or carry the bed i into and out of the bioclean room h and block the view on the foot side of the patient.

The present invention was made in view of the above and has its object to provide a bioclean room unit which affords comfortableness to a patient staying inside, which has good operativeness and is less costly, which is broad in space and less oppressive, which allows the patient to use a medical console on a wall of a sickroom and which facilitates carrying in and out of a bed and provides improved visibility on the foot side of the patient.

BRIEF SUMMARY OF THE INVENTION

The invention provides a bioclean room unit which comprises a frame body having a top plate thereon and provided on a floor, with at least one of side portions of the frame body being opened, and a transparent resin curtain provided to be selectively opened and shut to cover the opened side portion of said frame body, whereby an inside space is defined by said frame body and curtain to form a bioclean room, said bioclean room being equipped with an air blow duct so as to blow air into the bioclean room from above a patient's head, said frame body having an air flow passage which runs upward from the foot side of the patient so as to deliver the air in the frame body and along the top plate to the air blow duct, said air flow passage being equipped with an air cleaning device therein to clean up the air.

According to the invention, the air blow duct is provided on the top plate above the patient's head so as to allow the flow velocity of the air from the blow outlet to lower before it reaches around the patient's face.

According to the invention, the frame body has an opening on the head side of the patient through which a medical console on a wall of a sickroom can be received to be positioned inside the bioclean room when a front surface of the frame body is brought into abutment against the wall.

According to the invention, a fan in the air cleaning device is provided at least on the foot side of the patient in the air flow passage.

According to the invention, the air cleaning device is equipped with means for removing dust in the air passing through the air flow passage, means for removing stinking substances in the air, and means for sterilizing germs captured together with particles.

According to the invention, opening the curtain causes a curtain switch to be switched on to increase the quantity and/or flow velocity of the air from the fan. Shutting the curtain causes the curtain switch to be switched off to decrease the quantity and/or flow velocity of the air from the fan at a predetermined time after the switch-off.

According to the invention, the front surface of the frame body which is positioned on the head side of the patient during use is brought into close contact with the wall of the sickroom. Therefore, the medical console on the wall of the sickroom is positioned inside the bioclean room.

The air introduced into the air flow passage from the foot side of the patient in the frame body is cleaned up by the air cleaning device, delivered into the air blow duct and blown into the bioclean room via the air blow outlets of the air blow duct. In this way, the bioclean room is kept germ-free. Since the quantity of air flow from the fan is increased upon opening of the curtain, the bioclean room is surely kept germ-free.

According to the invention, the fan which may be a source of noise is positioned on the foot side of the patient and therefore is less noisy to the patient so that the patient may feel comfortable without being aware of the noise to apply their mind to having treatment in the bioclean room.

Since the flow velocity of air via the air blow outlets of the air blow duct lowers before it reaches around the patient's face, the patient does not feel irritated by the air flow.

The dust removing means, which last for longer periods, require less frequent replacement, resulting in reduction in cost.

Since the quantity and/or flow velocity of the air from the fan is automatically adjusted upon opening and shutting of the curtain, reliability for biological cleanliness performance of the bioclean room is enhanced.

To occupy much space in the bioclean room secures a space for treatment and gives the patient a sense of security.

For communication with a nurse, the patient may use the medical console from inside of the bioclean room.

No pillars oppositely on the foot side of the patient enable a bed to be easily brought in/out and improve visibility around the bed.

DETAILED DESCRIPTION OF THE PREFERRED EMBODIMENT

Figure 1:
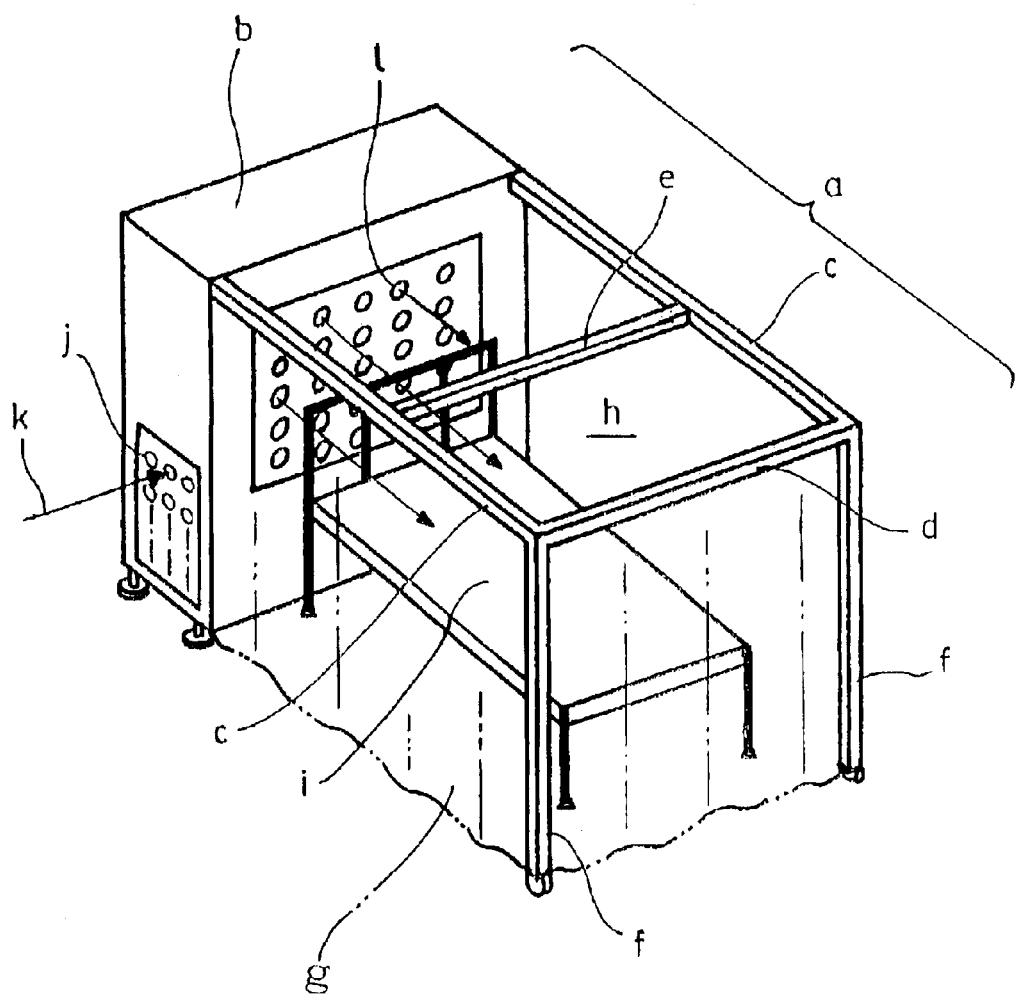
FIG. 1 is a perspective view showing a conventional bioclean room unit.
Figure 2:
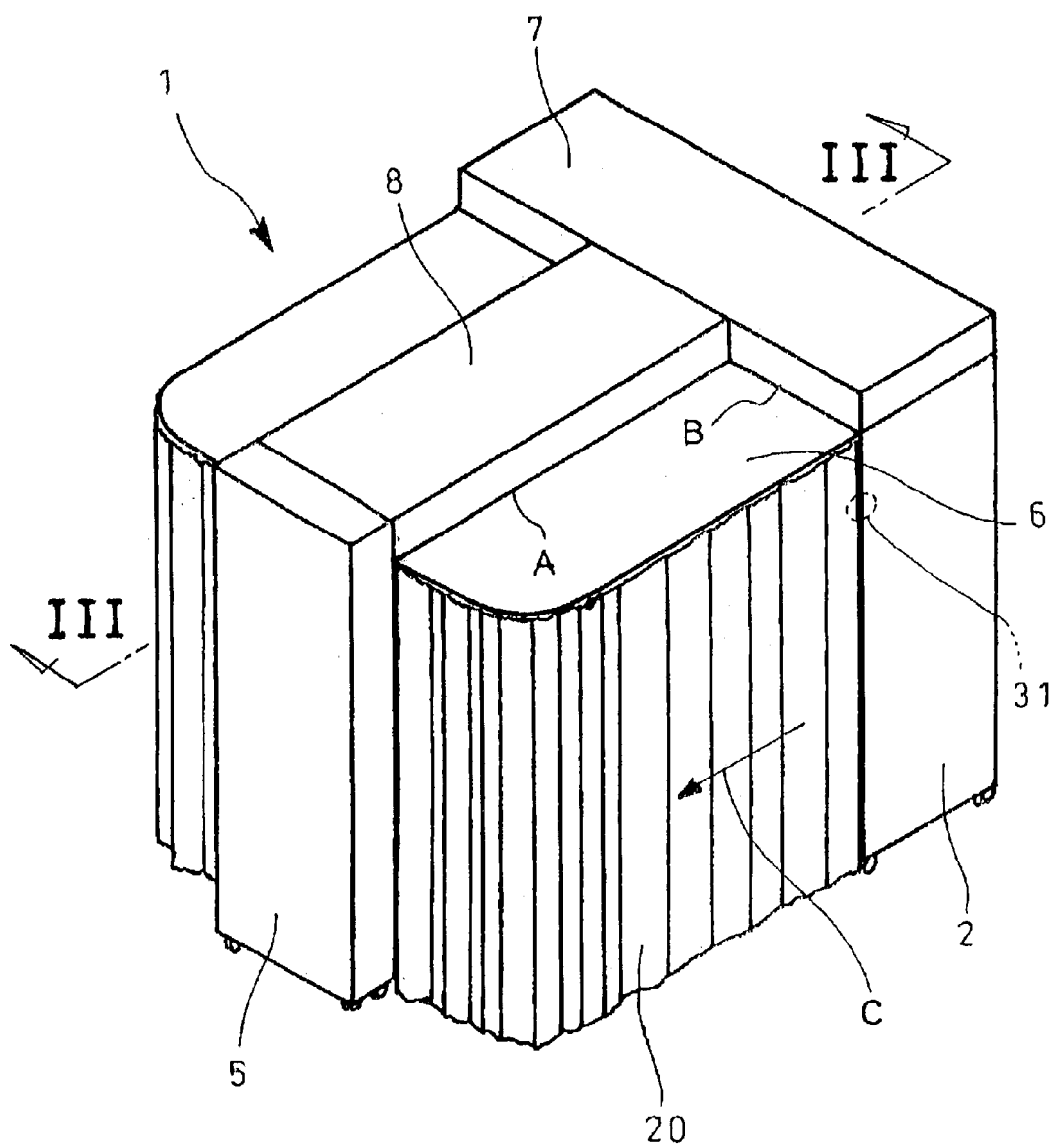
FIG. 2 is a perspective view showing a bioclean room unit according to an embodiment of the invention.
Figure 3:
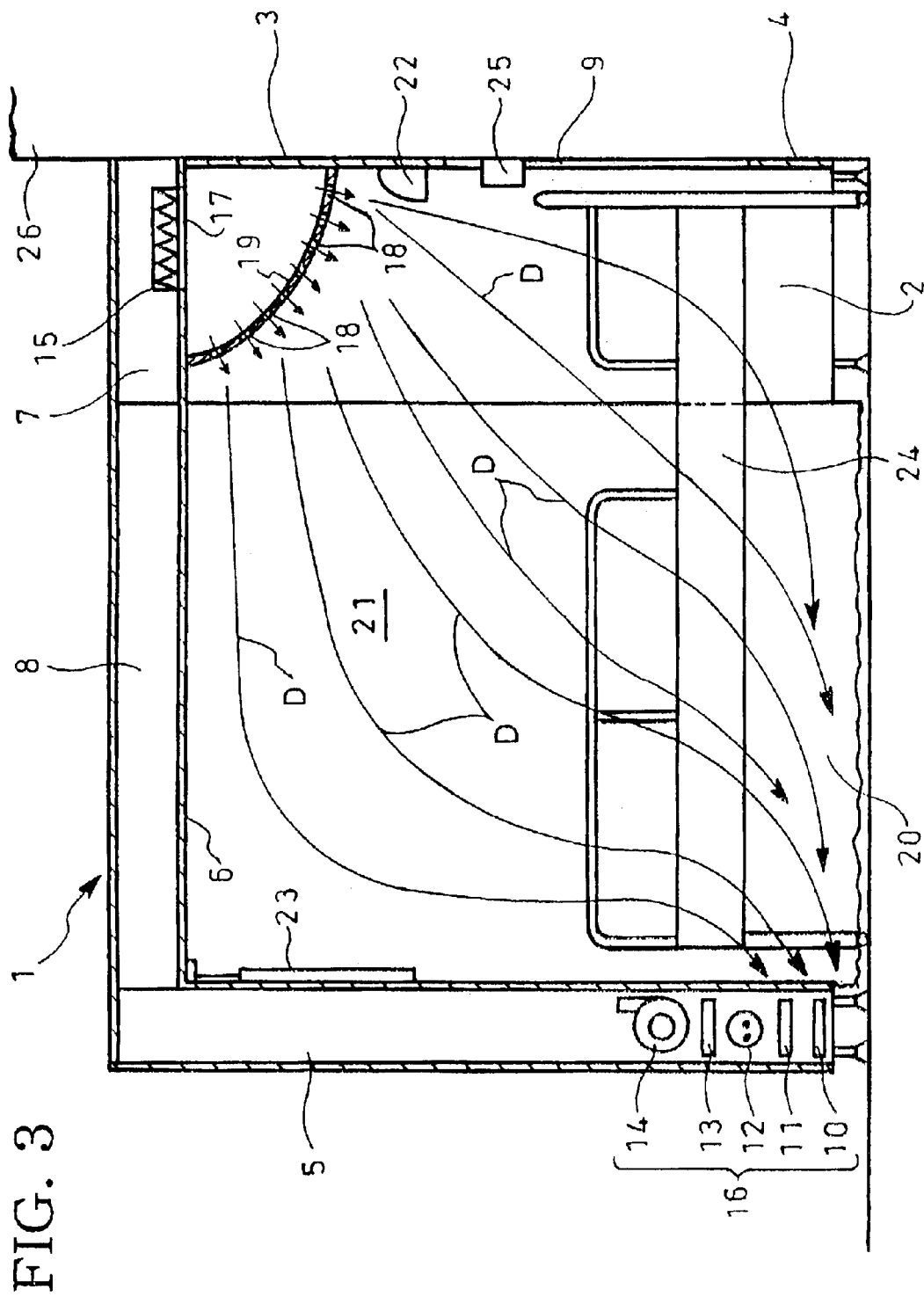
FIG. 3 is a sectional view taken along the line III—III in FIG. 2.
Figure 4:
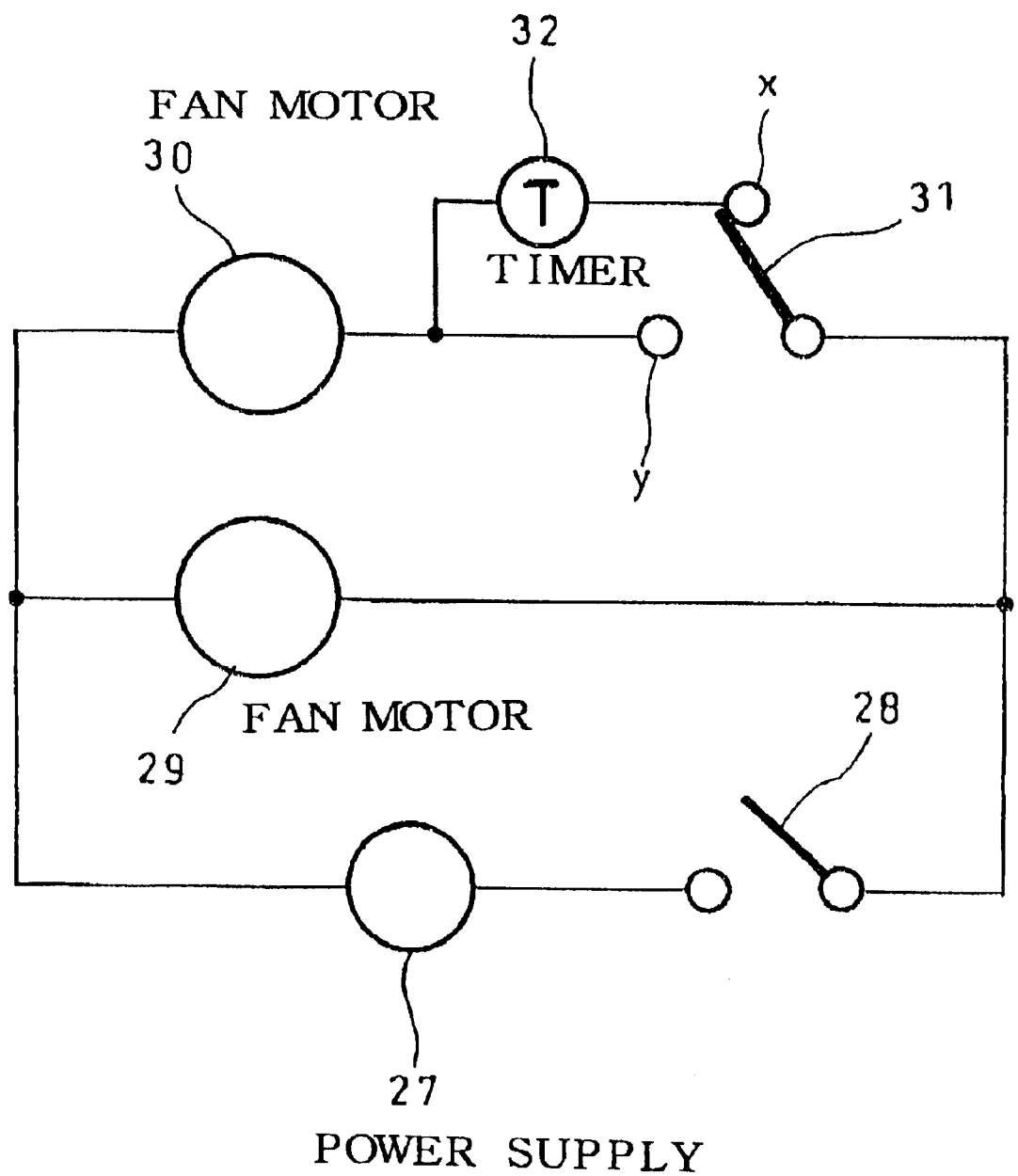
FIG. 4 is an electrical circuit diagram showing how two fans are switched and operated.

An embodiment of the invention will be described in reference to the accompanying drawings. FIGS. 2 to 4 show an embodiment of a bioclean room unit according to the invention.

In FIGS. 2 and 3, reference numeral 1 denotes a frame body of the biological clean room unit. The frame body 1 comprises a pair of opposite side plates 2 provided upright to serve as front pillars; panel 3 attached to upper front ends of the side plates 2 to interconnect the side plates 2; panel 4 attached to lower front ends of the side plates 2 a distance apart from the panel 3 to interconnect the side plates 2; a hollow box 5 positioned upright and between the side plates 2 when viewed from back to serve as a rear pillar, said box 5 having a width smaller than a distance between the side plates 2; a top plate 6 having one end portion attached at its side edges to the upper ends of the side plates 2 so as to extend horizontally to the box 5 and the other end portion attached to a portion of the box 5 adjacent to the upper end of the box 5, said top plate 6 having a width substantially as large as the distance between the side plates 2; an open-bottomed box 7 connected to an upper surface of the top plate 6 and to the side of the side plates 2, said box 7 having a length substantially equal to the distance between the side plates 2 and a width substantially equal to a width of the side plates 2; and an open-bottomed duct 8 attached to the upper surface of the top plate 6 and extending horizontally and axially of the bioclean unit, said duct 8 having a width substantially equal to that of the box 5, said duct 8 having one end connected to and communicated with the upper end of the box 5, and the other end connected to and communicated with a rear end of the box 7. Thus, an opening 9 is provided between the panels 3 and 4.

In the frame body 1, each of corners A defined between the duct 8 and the top plate 6 and corners B defined between the box 7 and the top plate 6 is formed in a small arched section having a predetermined radius so as to prevent dust from gathering at the corners A and B.

The box 5 of the frame body 1 allows air introduced through its lower opening to flow inside upwardly so as to serve as an air flow passage. The open-bottomed duct 8 forms an air flow passage in cooperation with a part of the top plate 6 so that the air from the box 5 is allowed to flow inside the duct 8. In addition, the open-bottomed box 7 forms an air flow passage in cooperation with a part of the top plate 6 so that the air from the duct 8 is allowed to flow therein.

From the upstream side to the downstream side in the direction of air flow, in other words, from the bottom to the top, the box 5 is equipped with a pre-filter 10, a photocatalytic filter 11, a catalytic excitation lamp 12 in the form of a UV lamp, a medium efficiency filter 13 and two fans 14 (only one of which is shown in FIG. 3) while the box 7 is equipped with an HEPA filter 15 therein. In this way, the pre-filter 10, the photocatalytic filter 11, the catalytic excitation lamp 12, the medium efficiency filter 13 and the fans 14 provide a fan unit 16 while the fan unit 16 and the HEPA filter 15 provide an air cleaning device.

The pre-filter 10, the medium efficiency filter 13 and the HEPA filter 15 serve as dust removing means. The photocatalytic filter 11 and the catalytic excitation lamp 12 serve as means for removing stinking substances. The catalytic excitation lamp 12 and the medium efficiency filter 13 serve as sterilizing means.

The catalytic excitation lamp 12 between the photocatalytic filter 11 and the medium efficiency filter 13 not only serves to remove stinking substances through excitation of a photocatalyst to decompose the stinking substances around the catalyst but also is capable of serving as means for sterilizing germs captured together with particles in the medium efficiency filter through gene-destroying action of the ultraviolet rays.

An air passing hole 17 is formed on the top plate 6 under the HEPA filter 15. Furthermore, an air blow duct 19 with a quadrant arch-shaped section and having a plurality of air blow outlets 18 is installed in the space surrounded by a lower surface of the top plate 6 and the panel 3 and is positioned between the side plates 2 and directly under the top plate 6.

Curtain rails (not shown) are attached to and along outer edge portions of the top plate 6 between rear ends of the side plates 2 (i.e., ends of the plates 2 away from the panels 3 and 4) and opposite sides of the box 5, respectively. The curtain rails are equipped with transparent plastic curtains 20 which may be selectively opened and shut. In this way, an internal space surrounded by the frame body 1 and the curtains 20 provides a bioclean room 21. A pattern of, for example, flowers or animals may be printed on the curtains 20 with anti-bacterial ink.

As is being described later, a curtain switch 31 is provided at a predetermined position on the frame body 1. While the curtains 20 are shut, only one of the fans 14 is in operation. Opening the curtain 20 in the direction of arrow C in FIG. 2 causes the curtain switch 31 to turn on to put the two fans 14 into operation so as to increase the quantity and flow velocity of the air. Once the curtain 20 is shut, the curtain switch 31 turns off. At a predetermined time (several minutes) after the curtain switch 31 turns off and the curtain 20 is shut, one of the two fans 14 in operation is stopped to reduce the quantity and flow velocity of the air.

In FIG. 3, reference numeral 22 denotes an illumination light 22 attached to an inner surface of the panel 3 so as to be positioned under the air blow duct 19; 23, a (healing) panel such as a picture made of incombustible board or cloth or a thin, wall-mounted television attached to a surface of the box 5 facing the bioclean room 21; 24, a bed provided in the bioclean room 21; and 25, a medical console on a wall 26 of a sickroom. In the case of the panel 23 being a picture, a pattern of flowers or animals may be printed thereon with anti-bacterial ink.

FIG. 4 is an electrical circuit diagram showing how the two fans 14 are switched and operated. In FIG. 4, reference numeral 27 denotes a power supply; 28, an operation switch; 29, a fan motor for driving one of the two fans 14; 30, a fan motor for driving the other fan 14; 31, the curtain switch; and 32, a timer. As is shown in FIG. 2, the curtain switch 31 is attached to a rear upper part of the side plate 2 on the head side of the patient.

A mode of operation of the embodiment will be described.

The bioclean room unit according to the embodiment is set up such that outer front surfaces of the panels 3 and 4 are in close contact with the wall 26 of the sickroom in use. Highly airtight seal members are adhesively applied on the outer front surfaces of the panels 3 and 4 so as to prevent external uncleaned air from coming in through the opening 9 and clean air inside the bioclean room 21 from leaking out. The medical console 25 is positioned inside the bioclean room 21 through the opening 9.

When nobody comes in or out or brings supplies into or out from the bioclean room unit, the curtains 20 are generally kept shut. In this case, the operation switch 28 in FIG. 4 is on and one of the two fans 14 in the fan unit 16 which is driven by the fan motor 29 is in operation, the catalytic excitation lamp 12 being lighted. Consequently, the air is introduced into the box 5 from the lower end of the box 5 by the driven fan 14 and coarse dust particles entrained in the air are captured by the pre-filter 10 and removed as the air passes through the pre-filter 10. It is to be noted that most of the air to be introduced into the box 5 is that in the bioclean room 21, the air having leaked out from the bioclean room 21 is compensated from the outside.

The air passed through the pre-filter 10 ascends in the box 5 to pass through the photocatalytic filter 11 with photocatalytic substances excited by UV rays from the catalytic excitation lamp 12. Consequently, stinking substances in the air are in contact with or stick to the photocatalytic filter 11 and are decomposed into inorganic gas components such as carbon dioxide and water, the air being thus cleaned up. Germs captured together with the particles by the medium efficiency filter 13 are sterilized by UV rays from the catalytic excitation lamp 12.

The cleaned air is discharged out from the fan 14 through the box 5 and the duct 8 into the box 7, where the air spreads and passes through the HEPA filter 15 and is delivered via the air passing hole 17 to the air blow duct 19. Fine dust particles in the air are removed by the HEPA filter 15 so that the air is completely cleaned up. The completely cleaned air is blown into the bioclean room 21 via the air blow outlets 18 and allowed to flow obliquely downward from the head side to the foot side of the patient as denoted by lines D in FIG. 3. Thus, the bioclean room 21 is kept germ-free, the air being again introduced into the box 5 from the lower end thereof.

When somebody comes in or brings supplies into the bioclean room 21, the curtain 20 is drawn aside to open. This causes the curtain switch 31 to be switched to side y in FIG. 4 to turn on, driving the fan motor 30. As a result, the other fan 14 which has been stopped is also activated to increase the quantity and flow velocity of air blown into the bioclean room 21 from the air blow duct 19. Therefore, the bioclean room 21 is surely kept germ-free even if the curtain 20 is opened. In this case, as the curtain 20 is opened, the timer 32 is reset to an operable state.

As the curtain 20 is shut, the curtain switch 31 is switched off to side x as shown in FIG. 4. As a result, the timer 32 is activated to keep the fan motor 30 in operation so that both the two fans are still in operation. At a predetermined time after the switch-off, the timer 32 cut out to stop the fan motor 30 and thus one of the two fans 14, so that the quantity and flow velocity of air blown into the bioclean room 21 are returned to the original levels.

Then, as the curtain 20 is again drawn aside to open, the switch 31 is switched on to the side y so that the fan motor 30 drives the fan 14, the timer 32 being reset. When the operation switch 28 is turned off, the fan motors 29 and 30 and therefore, both the two fans 14 are stopped. Also in this case, the timer 32 is reset.

For communication with a nurse, the patient can use the medical console 25 which is on the wall 26 of the sickroom and projected via the opening 9 into the bioclean room 21.

Since the fans 14 in the fan unit 16 which could be sources of noise are positioned on the foot side of the patient, the patient may feel comfortable without being aware of the noise so as to apply their mind to having treatment in the bioclean room 21.

Since the flow velocity of air from the air blow outlets 18 of the air blow duct 19 lowers before it reaches around the patient's face, the patient does not feel irritated by the air flow.

The curtain 20 may have a pattern of, for example, flowers or animals printed thereon. The panel 23 may also have such a pattern of flowers or animals or carry a thin, wall-mounted television. Owing to these, the patient may feel relaxed or find the space in the bioclean room 21 comfortable.

Since most of the air is used in circulation, the pre-filter 10, the photocatalytic filter 11 and the HEPA filter 15 last for longer periods so that less frequent replacement of the filters is required, leading to reduction in cost.

When the curtain 20 is opened or shut, the curtain switch 31 automatically adjusts how many fans 14 to operate or the quantity and flow velocity of air from the fan(s) 14, thereby enhancing reliability for the biological cleanliness performance of the bioclean room unit.

To occupy much space in the bioclean room 21 secures a space for treatment and gives the patient a sense of security.

No pillars arranged oppositely on the foot side of the patient enable the bed 24 to be easily brought in or out and improve visibility around the bed.

It is to be understood that the invention is not limited to the embodiment described above and that various changes and modifications may be made without departing from the spirit and scope of the invention. For example, in the embodiment, the pre-filter, the photocatalytic filter, the catalytic excitation lamp, and the medium efficiency filter are provided in the upright box positioned on the foot side of the patient while the HEPA filter is in the box positioned above the patient's head; those fixtures may be provided, wherever or however many, as long as they are provided in an air flow passage in a fixed order. Although the two fans are provided in the embodiment, the number of fans may be one or more provided that the quantity and flow velocity of the air are adjustable. Although the curtain switch is provided with respect to one of the curtains in the embodiment, the curtain switch may be provided for each of the curtains. The curtains are provided on both sides of the frame body in the embodiment; alternatively, only one of the sides of the frame body may be opened to provide a curtain only on the opened side.

As described above, the bioclean room unit according to the invention has a variety of advantages as follows:

I) The fan which could be a source of noise is positioned on the foot side of the patient and therefore is less noisy to the patient so that the patient may feel comfortable without being aware of the noise to apply their mind to having treatment in the bioclean room.

II) Since the flow velocity of air via the air blow outlets of the air blow duct lowers before it reaches around the patient's face, the patient does not feel irritated by the air flow.

III) The dust removing means, which last for longer periods, require less frequent replacement so as to reduce the cost.

IV) When the curtain is opened or shut, the curtain switch automatically adjusts the quantity and velocity of the air from the fan. This prevents the outside air from coming into the room even if the curtain is drawn aside to open, and enhances reliability for biological cleanliness performance in the bioclean room.

V) To occupy much space in the bioclean room 21 secures a space for treatment and gives the patient a sense of security.

VI) For communication with a nurse, the patient can use the medical console from inside of the bioclean room.

VII) No pillars arranged oppositely on the foot side of the patient enable a bed to be easily brought in and out and improve visibility around the bed.

What is claimed is:

1. A bioclean room unit comprising a frame body having a top plate thereon and provided on a floor, with at least one of side portions of the frame body being opened, and a transparent resin curtain provided to be selectively opened and shut to cover the opened side portion of said frame body, wherein an inside space is defined by the frame body and the curtain to form a bioclean room, said bioclean room being equipped with an air blow duct so as to blow air into the room from above a patient's head, said frame body having an air flow passage which runs upward from the foot side of the patient so as to deliver the air in the frame body and along the top plate to the air blow duct, said air flow passage being equipped with an air cleaning device therein to clean up the air, and wherein the frame body is equipped with an opening on the head side of the patient so as to make a medical console on a wall of a sickroom positioned inside the bioclean room when a front surface of the frame body is brought into abutment against the wall.

2. A bioclean room unit as claimed in claim 1, wherein the air blow duct is arranged on the top plate above the patient's head so as to allow the flow velocity of the air from the air blow outlets to lower before it reaches around the patient's head.

3. A bioclean room unit as claimed in claim 2, wherein a fan of the air cleaning device is installed in the air flow passage at least on the foot side of the patient.

4. A bioclean room unit as claimed in claim 3, wherein the air cleaning device is equipped with means for removing dust in the air passing through the air flow passage, means for removing stinking substances in the air, and means for sterilizing germs and bacteria captured together with particles.

5. A bioclean room unit as claimed in claim 4, wherein opening the curtain causes a curtain switch to be switched on to increase the quantity and/or flow velocity of the air from the fan and wherein shutting the curtain causes the curtain switch to be switched off to decrease the quantity and/or flow velocity of the air from the fan at a predetermined time after the switch-off.

6. A bioclean room unit as claimed in claim 3, wherein opening the curtain causes a curtain switch to be switched on to increase the quantity and/or flow velocity of the air from the fan and wherein shutting the curtain causes the curtain switch to be switched off to decrease the quantity and/or flow velocity of the air from the fan at a predetermined time after the switch-off.

7. A bioclean room unit as claimed in claim 2, wherein the air cleaning device is equipped with means for removing dust in the air passing through the air flow passage, means for removing stinking substances in the air, and means for sterilizing germs and bacteria captured together with particles.

8. A bioclean room unit as claimed in claim 7, wherein opening the curtain causes a curtain switch to be switched on to increase the quantity and/or flow velocity of the air from the fan and wherein shutting the curtain causes the curtain switch to be switched off to decrease the quantity and/or flow velocity of the air from the fan at a predetermined time after the switch-off.

9. A bioclean room unit as claimed in claim 2, wherein opening the curtain causes a curtain switch to be switched on to increase the quantity and/or flow velocity of the air from the fan and wherein shutting the curtain causes the curtain switch to be switched off to decrease the quantity and/or flow velocity of the air from the fan at a predetermined time after the switch-off.

10. A bioclean room unit as claimed in claim 1, wherein a fan of the air cleaning device is installed in the air flow passage at least on the foot side of the patient.

11. A bioclean room unit as claimed in claim 10, wherein the air cleaning device is equipped with means for removing dust in the air passing through the air flow passage, means for removing stinking substances in the air, and means for sterilizing germs and bacteria captured together with particles.

12. A bioclean room unit as claimed in claim 11, wherein opening the curtain causes a curtain switch to be switched on to increase the quantity and/or flow velocity of the air from the fan and wherein shutting the curtain causes the curtain switch to be switched off to decrease the quantity and/or flow velocity of the air from the fan at a predetermined time after the switch-off.

13. A bioclean room unit as claimed in claim 10, wherein opening the curtain causes a curtain switch to be switched on to increase the quantity and/or flow velocity of the air from the fan and wherein shutting the curtain causes the curtain switch to be switched off to decrease the quantity and/or flow velocity of the air from the fan at a predetermined time after the switch-off.

14. A bioclean room unit as claimed in claim 1, wherein the air cleaning device is equipped with means for removing dust in the air passing through the air flow passage, means for removing stinking substances in the air, and means for sterilizing germs and bacteria captured together with particles.

15. A bioclean room unit as claimed in claim 14, wherein opening the curtain causes a curtain switch to be switched on to increase the quantity and/or flow velocity of the air from the fan and wherein shutting the curtain causes the curtain switch to be switched off to decrease the quantity and/or flow velocity of the air from the fan at a predetermined time after the switch-off.

16. A bioclean room unit as claimed in claim 1, wherein opening the curtain causes a curtain switch to be switched on to increase the quantity and/or flow velocity of the air from the fan and wherein shutting the curtain causes the curtain switch to be switched off to decrease the quantity and/or flow velocity of the air from the fan at a predetermined time after the switch-off.

* * * * *